W. KAISLING.
CALLING DEVICE.
APPLICATION FILED DEC. 30, 1911.

1,195,589.

Patented Aug. 22, 1916.
2 SHEETS—SHEET 1.

Witnesses:
G. E. Mueller
Wm. Berghahn.

Inventor:
William Kaisling
By Curtis B. Camp
Attorney.

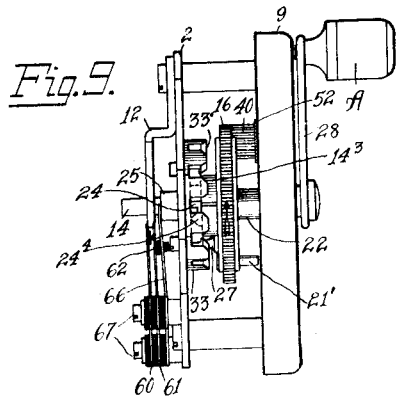
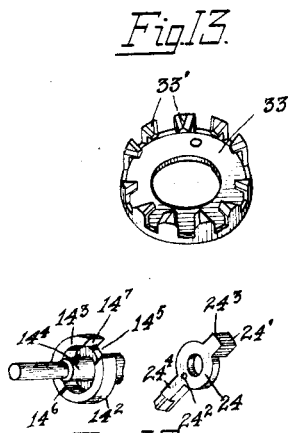
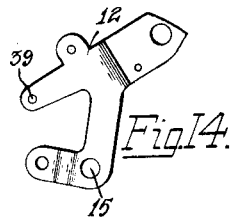
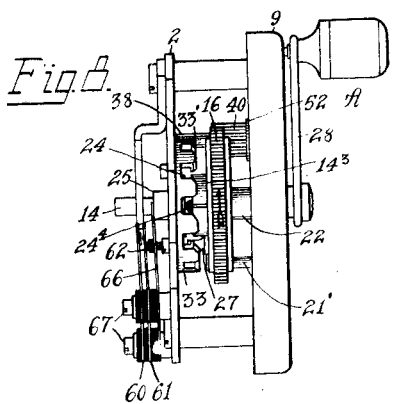
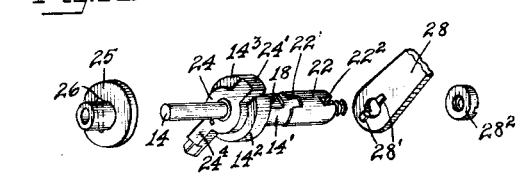
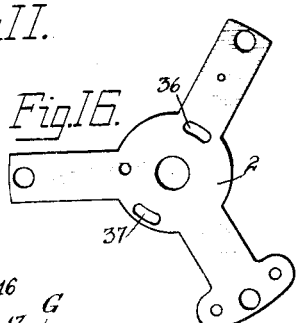
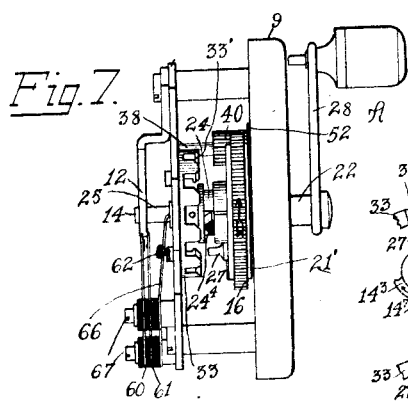
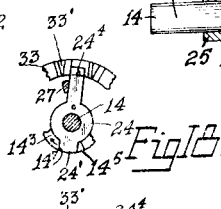
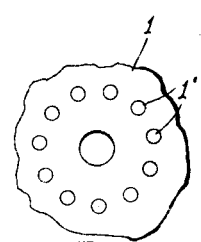

UNITED STATES PATENT OFFICE.

WILLIAM KAISLING, OF CHICAGO, ILLINOIS, ASSIGNOR TO KELLOGG SWITCHBOARD AND SUPPLY COMPANY, OF CHICAGO, ILLINOIS, A CORPORATION OF ILLINOIS.

CALLING DEVICE.

1,195,589.  Specification of Letters Patent.  Patented Aug. 22, 1916.

Application filed December 30, 1911. Serial No. 668,734.

*To all whom it may concern:*

Be it known that I, WILLIAM KAISLING, a citizen of the United States of America, residing in Chicago, county of Cook, State of Illinois, have invented certain new and useful Improvements in Calling Devices, of which the following is a specification.

My invention relates to calling devices, or impulse transmitters as they are also called, in general and more particularly to that type of device used in connection with so-called two-wire metallic line telephone systems in which directively controlled selector switches are operated responsive to interruptions of a metallic line circuit.

An object of my invention is to provide a calling device of the class referred to which is simple of construction, easy of manipulation and positive in operation.

There are certain features of my invention which will be more particularly pointed out in the specification and claims.

Figure 5:
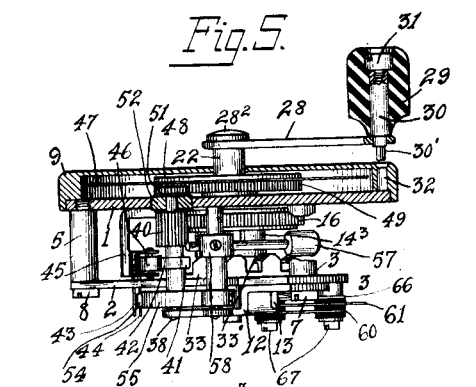
Figure 6:
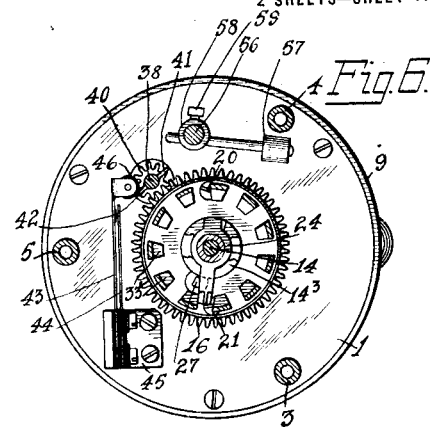
Figure 2:
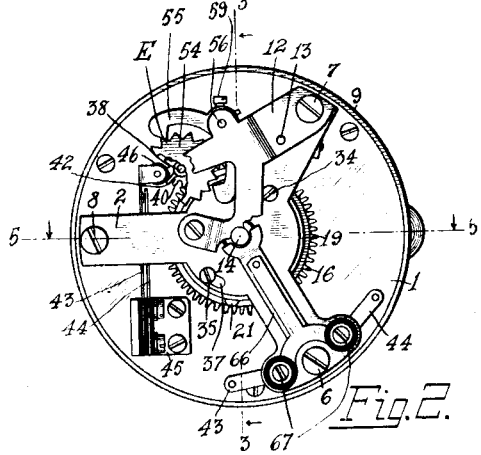
Figure 3:
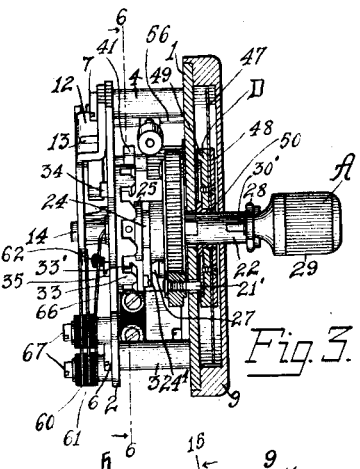
Figure 4:
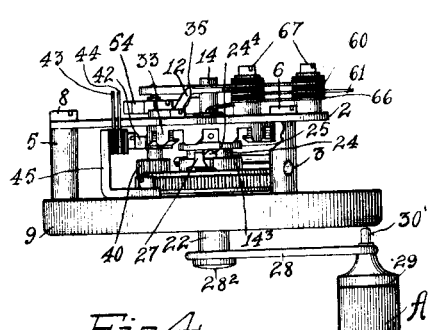
Figure 1:
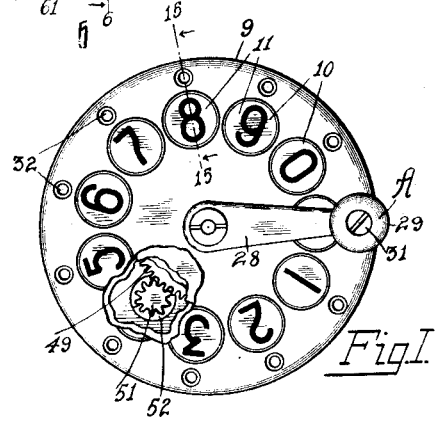
Figure 21:
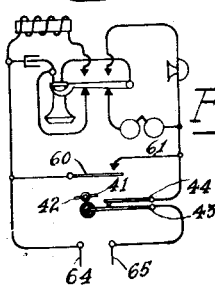

For a more complete understanding of my invention, reference is to be made to the accompanying drawings in which like reference characters indicate like parts and in which, Figure 1 is a face view of my device with a portion broken away to show the indicating-dial advancing gears. Fig. 2 is a rear view of my device with a portion of the escapement wheel broken away to more clearly show the coöperation between the impulse springs and their actuating members. Fig. 3 is an end view of Fig. 2 partly in section along the line 3—3 of Fig. 2 looking in the direction of the arrow indicated thereon. Fig. 4 is a bottom view of Fig. 2. Fig. 5 is a top view of Fig. 2 with some of the parts shown in section along the line 5—5 of Fig. 2, looking in the direction of the arrow indicated thereon. Fig. 6 is a rear sectional view of the device along line 6—6 of Fig. 3, looking in direction of arrow indicated thereon. Fig. 7 is an end view of the device, similar to Fig. 3, but with the setting member A in an opposite position, and illustrating only some of the parts. Fig. 8 is a view similar to Fig. 7, but with the actuating member A partly depressed. Fig. 9 is a view similar to Fig. 8, but with the actuating member fully depressed and locked. Fig. 10 illustrates the motor mechanism unit carried on the main shaft. Fig. 11 is a perspective disassociated view of the main shaft and some of the parts carried thereby. Fig. 12 is a perspective disassociated view of a portion of the main shaft and a latching and stop finger carried thereby. Fig. 13 illustrates in perspective a locking plate which coöperates with the latching finger upon the main shaft, for holding the setting member A in its fully depressed position while the impulse mechanism is operating. Fig. 14 illustrates a bracket bearing for supporting the ends of several of the shafts. Fig. 15 is a sectional view of the cap plate 9, along the line 15—15 of Fig. 1 looking in the direction of the arrow indicated thereon. Fig. 16 illustrates a bridge plate for supporting different parts of the apparatus. Fig. 17 illustrates the central portion of the front plate 1 of the main frame, showing particularly the arrangement of normal stop openings. Figs. 18, 19, and 20 show a normal, off normal, and depressed operative relation respectively, between the latching and stop-finger, and toothed member 33. Fig. 21 illustrates diagrammatically a well known substation telephone circuit with the calling device of my invention connected in circuit thereof.

In the preferred form of my invention, as illustrated, my device is adapted for transmitting any number of impulses from 1 to 10. Assuming that five impulses for instance are to be transmitted, the operation of the device generally speaking is as follows: Setting member A is rotated in a clockwise direction until it is opposite the indicating numeral 5 and it is then depressed to the position shown in Fig. 9. Motor and impulse mechanism is adjusted responsive to the rotation of the setting member, which upon being depressed, the adjusted impulse mechanism is released to operate, effecting five operations of the impulse springs. During the operation of the mechanism for transmitting the impulses, the setting member A is locked in its depressed position until the impulse mechanism has operated, whereby the said setting member is automatically released from its locked position, whereby it is available to be operated for transmitting another series of impulses.

Referring now more particularly to the construction of the device, it comprises a front plate 1 and a bridge plate 2 rigidly connected by studs 3, 4 and 5 suitably staked to plate 1, and secured to plate 2 by means of screws 6, 7 and 8. Secured to the front of plate 1 is a hollow face plate 9, having a plurality of openings 10 therein, preferably eleven in number as indicated in Fig. 1, representing ten operating and a normal position. Each opening 10 has a transparent plate 11, such as glass or celluloid, suitably secured therein. Secured to the rear of plate 2 is a bracket bearing 12, being preferably secured by means of the screw 7 and doweled by pin 13 which passes through both plates 12 and 2.

Suitably supported in the center of the device is a main shaft 14 preferably journaled at one end in the bearing 15 of bracket 12.

Fig. 10 shows a unit, mechanism C, including a geared spring barrel B loose upon a shaft 14, the said barrel comprising a hollowed gear member 16 containing a spring 17 secured at its inner end to a pin 18 carried by shaft 14, and at its outer end to the barrel 16. A cap 19 is secured to the barrel 16 by means of screws 20, 21 for holding spring 17 in place. A sleeve 22 is loosely fitted to shaft 14, being slightly larger in diameter than the portion 14' of shaft 14 so that spring barrel B rests between the shoulder caused by sleeve 22 and the shoulder 14² of shaft 14, and free to rotate on shaft 14, lateral movement thereof being prevented due to the supporting shoulders referred to. The slotted end 22' of sleeve 22 fits over projections integral with shaft 14 so that there is no relative rotary motion between the two members 14 and 22. Main shaft 14 also carries, preferably integral therewith, a ring flange 14³, more clearly shown in Fig. 12, carrying a coiled spring 23 shown in section in Fig. 10. A latch and stop member 24 is loosely supported upon the portion 14⁴ of shaft 14, being so mounted that it is free to be rotatably reciprocated thereon, its movement being limited by the play of lug 24' in slot 14⁵, this being indicated in Figs. 18, 19, 20. To hold member 24 in place upon shaft 14, a collar 25 is provided, being secured to shaft 14 preferably by means of a pin 26. Spring 23 is secured at one end to the slot 14⁶ and at its other end in the hole 24². Spring 17 which is the main operating or power spring for actuating the impulse mechanism is so coiled within barrel 16 that its tendency is to rotate geared spring barrel B upon its shaft 14 in the direction of the arrow indicated in Fig. 7. In order to hold barrel B at normal upon the shaft, a stop is provided preferably in the form of a pin 27 secured to plate 19 as indicated in Fig. 10. This stop 27 engages the adjustable finger stop 24⁴, and although the tendency of spring 23 is to rotate member 24 on its shaft in a direction opposite to the tendency of spring barrel B, spring 17 being of a greater tension overcomes spring 23, thus acting upon member 24 whereby the surface 24³ of lug 24' is pressed against surface 14⁷. Thus it will be seen that the mechanism shown in Fig. 10 comprises a unit, so assembled that the parts are all held in a normal position, which is as illustrated.

In operating the device it is preferably so arranged that the operating spring 17 is to be wound up according to the extent of operation of a setting member, each time the device is to be operated. Therefore, I secure a setting member A to main shaft 14, said member A preferably being in the form of a lever or arm 28 carrying a knob or handle 29 rotatably secured to said arm 28 by means of a stud 30 and screw 31, as illustrated more clearly in Fig. 5. A pair of ears 28' are suitably staked to arm 28 and adapted to fit in slots 22² of sleeve 22, this construction being shown in Fig. 11. A nut 28² is also provided to thread on to the threaded end of shaft 14 after the arm 28 is in place, thus holding the setting member A securely to shaft 14 so that when member A is rotated shaft 14 is carried around thereby.

The unit mechanism C illustrated in Fig. 10 is supported by its shaft 14 at one end in bracket 12 while its sleeve 22 is journaled in the central bearing of face plate 9. Shaft 14 and its mechanism, that is the unit of Fig. 10, is adapted also to be longitudinally movable in its bearing, its normal position being shown in Fig. 7 while its depressed position is illustrated in Fig. 9. Mechanism C is held in a normal position with a face of member 16 against the surface of front plate 1, a leaf spring 66 being provided to hold it in such normal position. Said spring 66 is secured to plate 2 preferably by means of screws 67, it having a bifurcated end partly encircling shaft 14 and resting against the shoulder of collar 25, so that when member A is depressed it moves against the tension of said spring 66.

Setting member A is adapted to be locked against actuation when in its depressed position and for this purpose I provide locking means preferably in the form of a small projecting pin 30' which is an extension of stud 30. I also provide a series of coöperating locking and guiding holes 32, one for each operating position of setting member A. When member A is rotated to any operating position, pin 30' enters the associated locking hole 32 as member A is depressed. Spring barrel B is adapted to rest in any one of a plurality of normal positions, there being eleven such positions, and in order to hold barrel B against rotation in any of its positions, a pin 21', preferably an extension of screw 21, is provided, adapted to coöperate with a series of stops, preferably in the form of holes 1' in face plate 1, which are adapted to receive pin 21'.

In rotating setting member A for a setting operation of the device, it is moved in a clockwise direction, rotating shaft 14 of course and the finger 24⁴ which is carried thereby, and also winding motor spring 17. When member A reaches any of its operating positions with pin 30' above an opening 32, setting member A may then be depressed to the position illustrated in Fig. 9. It will be noted that as shaft 14 moves inwardly carrying barrel B, pin 21' moves out of its coöperating opening 1' and pin 30' moves into its coöperating opening 32, and as soon as the pin 21' is clear of plate 1 it will be seen that spring 17 will rotate barrel B on its bearing until the stop pin 27 carried thereby catches up to and engages finger 24⁴ automatically releasing shaft 14 which is again moved outwardly, due to the action of spring 66, pin 21' moving into another opening 1'. From this it will be seen that each time setting member A is advanced to another operating position and then depressed to release the wound-up spring, barrel B advances to another position according to adjustment of setting member A.

When setting member A has been fully operated, that is, rotated and then depressed to release the adjusted mechanism, it is locked in such an operated position, not only against rotation, but also in its depressed position. To this end I provide a locking member preferably in the form of a toothed disk 33 illustrated in Fig. 13, having a plurality of engaging members 33' adapted to coöperate with finger 24⁴ when member A is depressed in any of its operated positions. The said locking disk 33 is secured to plate 2 by means of a pair of screws 34—35 passing through slotted openings 36—37 in plate 2. These slotted openings 36—37 allow rotary adjustment of disk 33 so that its teeth 33' may be brought into correct operative relation with finger 24⁴.

The manner of operating the setting member A to adjust and release the motor mechanism was just described and the coöperation between teeth 33' and finger 24⁴ for locking the setting member in its depressed position will now be described.

Fig. 18 shows the relative position of finger 24⁴ and a tooth 33' when member A is in a normal position. As member A is rotated in starting a setting operation, spring 23 acts upon member 24 to rotate it on its bearing until the lug 24' moves to its alternate position in slot 14⁵ as indicated in Fig. 19. With the member A in one of its operating positions, finger 24⁴ is in a position with relation to a tooth 33' as illustrated in Fig. 19. Therefore, when the setting member is depressed, the beveled end of finger 24⁴ engages a beveled surface of a tooth 33'. Then as the inward movement of shaft 14 is continued finger 24⁴ is rotated on its bearing against the tension of spring 23, due to its sliding engagement with a beveled face of the tooth 33, and upon the setting member reaching its fully depressed position, which is as indicated in Fig. 9, finger 24⁴ snaps back under the associated tooth 33' into a position as illustrated in Fig. 20. It will be seen that due to finger 24⁴ snapping back beneath a tooth 33', that the setting member is locked in its depressed position until finger 24⁴ is again released. As previously stated when the setting member is depressed after being rotated to one of its operating positions, the spring barrel B is released as pin 21' clears plate 1, but to insure against releasing spring barrel B before the setting member A is locked in its depressed position, finger 24⁴ is so related with respect to the underside of teeth 33' that it snaps back into a locking position substantially at the same time that pin 21' clears plate 1.

To release the setting member from its fully depressed position, which means that finger 24⁴ must be moved out of locking engagement with its associated tooth 33', the advancement of barrel B after being released, causes pin 27 to advance into engagement with finger 24⁴, whereby the continued forward movement of pin 27 moves finger 24⁴ into a position as illustrated in Fig. 18 where it is clear of tooth 33', allowing spring 66 to restore the setting member to a normal position, where it may be again operated.

From the previous description, it will be understood that the rotation or operation of spring barrel B is according to the adjustment of the setting member A, that is, if setting member A is moved from normal to a fifth operating position, it means that the motor mechanism G is adjusted and released to advance a distance of five positions, and likewise through any number of positions according to the adjustment of member A. Therefore in connecting the impulse mechanism with the motor mechanism, I preferably employ a geared shaft 38 journaled at one end in bearing 39 of bracket 12, and carrying pinion 40 which is in mesh with the gear 16. Gear 16 and pinion 40 are so proportioned that when gear 16 is rotated over a space of one operating position, shaft 38 makes one half revolution. A pair of wings 41—42 are provided for shaft 38, they being adapted to coöperate with the impulse springs as will be more fully referred to.

A preferred arrangement of impulse springs is shown, comprising contact springs 43—44 normally in contact. Said springs are insulatingly mounted on a bracket 45 which is secured to plate 1. Contact spring 43 carries a roller 46 which is adapted to coöperate with the wings 41—42 in such a manner that said springs 43—44 have their contact interrupted each time a wing 41 or 42 passes roller 46. Therefore if in operating the calling device the motor mechanism is advanced over a space of five operating positions, it follows that shaft 38 receives two and one-half revolutions whereby its wings 41—42 interrupt contact springs 43—44 five times.

In the previous description I have referred to the setting member A and motor mechanism as always partaking of a forward motion and as this results in the setting member A assuming a different normal position each time it is operated, I provide an advancing indicating dial D which follows the setting member and motor mechanism, so that after each operation of the calling device, the indicating dial is in a definite relation to the setting member A, that is, the relation between the indicating numerals and setting member A after each operation is as is shown in Fig. 1. This indicating device D comprises a numbered plate 47 numbered as indicated in Fig. 1 and securely clamped between two disks 48—49 which are rigidly secured to a hub 50 which is rotatably mounted upon sleeve 22, this being more clearly shown in Fig. 3. The disk 49 is also preferably arranged as a gear having the same number of teeth as spring barrel gear 16, the teeth of gear 49 being in mesh with a pinion 51 carried by shaft 38 (Fig. 5). This pinion 51 has the same number of teeth as pinion 40 also carried by shaft 38, and is preferably integral with said shaft 38. Upon reference to Fig. 5 it will be noted that a portion of shaft 38 between pinions 51 and 40 acts as a bearing, being journaled in a split collar 52, slightly larger in diameter than pinions 40 and 51 and adapted to be pressed into a hole of plate 1. Due to the fact that gears 16 and 49 have the same number of teeth and pinions 40 and 51 the same number of teeth, and as gear 16 advances according to the advancement of member A, it follows that the indicating dial D advances corresponding to the advance of the setting member A each time the calling device is operated.

In impulse transmitters or calling devices of the present type, it is essential that the impulse mechanisms operate at a predetermined speed so that the impulses are transmitted at substantially a definite rate. Therefore, I provide governor means preferably in the form of escapement mechanism E comprising an escapement wheel 54 rigidly secured in a suitable manner to shaft 38. Coöperating with the said wheel is a pallet 55 suitably fastened to a shaft 56 which is pivotally supported in bracket 12 and plate 1. An adjustable weighted member 57 is also secured to a shaft 56 preferably by means of a collar 58 and set screw 59. By means of this governor mechanism it is apparent that when the motor mechanism is wound up and thereafter released for operation its movement will be retarded whereby the impulses may be effected at a rate determined by the adjustment of the member 57.

When using a calling device of the present type with a substation telephone, I provide means whereby the substation apparatus may be shunted during the transmission of impulses, thereby cutting down the substation resistance and causing a more positive operation of the mechanism operated responsive to such impulses. To this end I provide a pair of normally open contact springs 60, 61 insulatingly mounted on plate 2 by means of screws 67. These springs coöperate with an insulation button 62 carried by leaf spring 66 in such a manner that when the actuating member A is fully depressed as shown in Fig. 9, said shunt springs 60, 61 have their contacts closed, and as previously stated setting member A being locked in an operated position while the impulses are being transmitted, it follows that shunt springs 60, 61 remain in contact until setting member A is released.

Fig. 21 represents diagrammatically a well known form of substation with my calling device connected in circuit therewith. The telephone itself comprises well known elements and circuit arrangements and it is believed any further reference thereto is unnecessary. In the diagram, impulse springs 43—44 are shown connected in series with the direct current path through the telephone whereby when the receiver is removed from its switch-hook, said springs 43, 44 are connected in series with the line conductors 64, 65. Shunt springs 60, 61 are connected in shunt with the telephone apparatus whereby when they are closed the telephone apparatus is shunted out of the line circuit.

Operation: Having described the construction and coöperation between some of the elements of my calling device its operation in transmitting a series of impulses, or rather a series of interruptions of its impulse springs, will now be described.

Assuming the operator desires to effect six interruptions of impulse springs 43, 44, and that the device is in a position as illustrated, by means of handle 29, the setting member A is rotated until it is in a position above the indicating numeral 6. This setting operation of member A rotates its shaft 14 whereby the spring 17 is wound accordingly. Due to the engagement between pin 21' of spring barrel B and its coöperating holding stop 1', spring barrel B remains stationary during the rotary movement of setting member A. At the beginning of the said setting movement, collar 14³ being secured to shaft 14 rotates in the direction of the arrow indicated thereon (Figs. 18, 19), thus allowing spring 23 to act upon member 24 rotating it slightly on its pivot until the lug 24' stops in its alternate position in slot 14⁵ as indicated in Fig. 19. The continued setting movement of member A until it reaches a sixth operating position brings finger 24⁴ into a position relative to a tooth 33' as indicated in Fig. 19, but, of course, it is to be understood that finger 24⁴ is six positions in advance of stop 27 instead of one position as shown in Fig. 19. This setting movement of member A as described, as will be seen, effects an adjustment of the motor mechanism whereby when it is subsequently released it will respond to cause a travel of the impulse mechanism corresponding to the adjustment of the setting member, in this case over six positions. The operator now depresses member A moving it inwardly so that pin 30' enters guide and locking hole 32, in the present instance it being the hole 32 associated with indicating numeral 6 in Fig. 1. As shaft 14 moves inwardly carrying spring barrel B therewith, pin 21' is moving out of its associated opening 1'. The inward movement of shaft 14 also causes finger 24⁴ by its beveled surface adjacent to an associated tooth 33', to ride over the said tooth 33' rotating slightly against the tension of spring 23 until shaft 14 has moved inwardly far enough for finger 24⁴ to clear the inner surface of the engaged tooth 33'. In Figs. 7 and 8 the end of finger 24⁴ is shown in black shading to more clearly indicate its position, Fig. 7 being at normal and Fig. 8 in an intermediate position. As finger 24⁴ clears the associated tooth 33', it snaps back beneath said tooth to the position indicated in Fig. 20, whereby the setting member is held in its depressed position, which is as indicated in Fig. 9. Simultaneously with this snapping back or locking movement of finger 24⁴, or substantially so, pin 21' of spring barrel B clears plate 1 as indicated in Fig. 9, whereby the motor mechanism is free to act upon the impulse mechanism. Also as the shaft 14 reaches its fully depressed position, shunt springs 60, 61 are closed as indicated in Fig. 9. The release of pin 21' from its holding stop 1' allows spring 17 to act upon driving gear 16, rotating it about shaft 14 in the direction of the arrow indicated thereon, and as finger 24⁴ was advanced six operating positions ahead of stop pin 27, the said rotation of gear 16 is continued until pin 27 is again in stopping engagement with finger 24⁴ as will be more definitely described. Gear 16 in rotating through the six operating positions as stated, causes shaft 38 to make three revolutions, whereby wings 41—42 act upon the roller 46, lifting spring 43 out of engagement with contact spring 44, six times.

As previously referred to, each time the calling device is actuated the rotatable indicating dial D advances corresponding to the operation of the setting member A. In the operation just described it was assumed that the motor mechanism advanced through six operating positions corresponding to the advancement of setting member A, therefore dial D is caused to advance over a distance of six operating positions bringing its normal point around to the opening beneath which, in Fig. 1, the indicating numeral 6 is shown. This operation of dial D is brought about through the connection existing between gears 49 and 16 with the rigidly connected pinions 51—40. In other words, gears 16, 49 having the same number of teeth and pinions 40—51 having the same number of teeth, it will be seen that as driving gear 16 is rotated that gear 49 and dial D, have the same arcuate travel as gear 16.

I have referred to the operation of the impulse mechanism caused by the advancing of gear 16 through six operating positions, but just as it is completing its travel the unlatching operation of finger 24⁴ from tooth 33' takes place, this being brought about as follows: Upon pin 27 which is carried by gear 16, advancing into engagement with finger 24⁴, which is just before the completion of its forward movement, it carries finger 24⁴ along with it rotating member 24 on its pivot until its lug 24' again engages the stop 14⁷ as indicated in Fig. 18, stopping the forward movement of gear 16. The disk 33 is so adjusted with relation to finger 24⁴ that upon member 24 being brought into the position as indicated in Fig. 18 finger 24⁴ is clear of tooth 33' whereby leaf spring 66 is free to restore setting member A to normal. As shaft 14 moves outward the pin 21' carried by barrel B enters a holding opening 1'. Also due to the restoration of shaft 14 shunt springs 60—61 have their contact interrupted whereby the shunt is removed from about the substation apparatus, when the calling device is connected as shown in Fig. 21.

From the previous description, it will be seen that if the setting member A is in a position as indicated in Fig. 1 and it is then moved to the operating position indicated by the numeral 6 and depressed, the impulse mechanism is thereby operated to cause six operations of the impulse springs also causing indicating dial D to advance through a distance of six operating positions, bringing it into the same relation with actuating member A as indicated in Fig. 1, but advanced six positions. To operate the calling device again the setting member A is again rotated to the indicating numeral corresponding with the number of impulse spring operations desired and is then depressed to release the impulse mechanism for operation as before, whereby dial D is again advanced according to the advancement of the setting member.

With the calling device at normal the setting and starting member A may be depressed without first rotating it, but it is apparent that such an operation of member A simply moves mechanism C inwardly closing shunt springs 60, 61, but as the motor mechanism has not been wound, it will be seen that upon the operator releasing his hold upon member A, said member is simply restored, that is again moved outwardly by the action of leaf spring 66. Or should the operator rotate member A and then release his hold thereupon without depressing it, although spring 17 was wound by such an operation, it is apparent that if member A is not depressed it simply snaps back to the normal point from which it was moved without effecting an operation of the impulse mechanism. From this it will be seen that in order to cause an operation of the impulse mechanism, member A must be rotated to adjust the mechanism, and then depressed to release it from such adjustment for operation.

In working out my invention I have preferably arranged it in a most compact form to more readily adapt it for commercial use, but I do not desire to be limited to the structure as disclosed as it is apparent that many changes and modifications thereof may be made without departing from the spirit and scope of the appended claims.

What I claim as new and desire to secure by Letters Patent of the United States is:

1. A calling device including a setting member adapted to be advanced to a plurality of operating positions, a numbered indicating dial for the setting member, and means operated by the advance of the setting member for thereafter advancing said dial according to the operation of the setting member.

2. A calling device including a setting member having a plurality of operating positions, a numbered indicating dial for said member having a normal indicating point, and means for advancing said indicating dial according to an adjusting operation of the setting member whereby its normal point follows said setting member to its adjusted position.

3. A calling device comprising impulse mechanism, a setting member adapted to be moved to a plurality of operating positions for adjusting said mechanism, an indicating dial for said member, and mechanism for advancing said dial each time the calling device is operated, according to the actuation of said setting member and causing it to remain in such advanced position until the next operation of the device.

4. A calling device comprising impulse mechanism, a setting member adapted to be moved to a plurality of operating positions for adjusting said mechanism accordingly, an indicating dial for said member, and means connecting said dial and mechanism whereby said dial is advanced each time the calling device is operated, according to the actuation of said setting member and causing it to remain in such advanced position until the next operation of the device.

5. A calling device comprising impulse mechanism having different degrees of actuation, a setting member having a plurality of operating positions corresponding to the different degrees of actuation of the impulse mechanism for adjusting said mechanism, an indicating dial for said member, and means for advancing said dial each time said mechanism is operated, according to the actuation of said setting member and causing it to remain in such advanced position until the next operation of the device.

6. A calling device comprising impulse mechanism, a rotatable setting member adapted to be moved to a plurality of operating positions for adjusting said mechanism accordingly, means for thereafter operating said mechanism, a rotatable indicating dial for said setting member, and means for advancing said dial each time the calling device is operated, according to the actuation of the setting member.

7. A calling device comprising impulse mechanism, a setting member adapted to be moved to a plurality of operating positions for adjusting said mechanism, an indicating dial for said member, means for operating said mechanism according to the adjusting movement of said setting member, and means operatively connecting said dial and mechanism for advancing said dial each time said mechanism is operated, according to the actuation of the setting member.

8. A calling device comprising impulse mechanism having different degrees of operation, a setting member having a plurality of operating positions corresponding to the degrees of operation of the impulse mechanism for adjusting said mechanism, an indicating dial for said member, means for operating said impulse mechanism according to the adjusting movement of said setting member, said indicating dial being responsive to said impulse mechanism when operating, whereby it is advanced according to the adjusting operation of the setting member.

9. A calling device comprising impulse mechanism, a manually operated setting member adapted to be moved to a plurality of operating positions for adjusting said impulse mechanism accordingly, and means responsive to a subsequent manual operation of said setting member while in its operated position for releasing said mechanism from its adjustment for operation.

10. A calling device comprising impulse mechanism, a manually operated setting member therefor normally at rest, means responsive to two separate and distinct off-normal manual movements of said member for first adjusting said mechanism and thereafter releasing it for operation, and means whereby said member may thereafter be restored to a normal position.

11. A calling device comprising impulse mechanism, a manually operated setting member therefor normally at rest, means responsive to off-normal operations of said member for first adjusting said mechanism and thereafter releasing it for operation, and means whereby said member may thereafter be restored to a normal position.

12. A calling device comprising impulse mechanism, a manually operated setting member therefor normally at rest, means responsive to off-normal operations of said member for first adjusting said mechanism and thereafter releasing it for operation, and means for locking said member in its operated position against further actuation while said impulse mechanism is operating.

13. A calling device comprising impulse mechanism having a plurality of operating positions, a manually operated setting member for adjusting said mechanism to any of its positions, means responsive to a subsequent off-normal manual operation of said setting member for releasing said mechanism from its adjustment for operation, and means for locking said setting member in its operated position against further actuation while said impulse mechanism is operating.

14. A calling device comprising a rotatable setting member adapted to be advanced to a plurality of operating positions, a rotatable numbered indicating dial for the setting member, and mechanism responsive to the operation of said setting member for thereafter rotating said dial according to the operation of the setting member.

15. A calling device comprising a setting member adapted to be advanced to a plurality of operating positions, a numbered indicating dial for the setting member, and motor mechanism for advancing said dial according to the operation of the setting member.

16. A calling device comprising impulse mechanism, a manually operated setting member primarily adjustable for setting said mechanism, and means responsive to a subsequent transverse movement of said member for releasing the mechanism from its adjustment for operation.

17. A calling device comprising impulse mechanism, a manually operated rotatable setting member primarily adjusted for setting said mechanism, and means responsive to a subsequent transverse manual movement of said member for releasing the mechanism from its adjustment for operation.

18. A calling device including impulse mechanism provided with a plurality of operative positions, a setting member for adjusting said mechanism to any of its different positions, means controlled by the setting member for releasing said setting mechanism for operation when adjusted to any of its operative positions, and means for preventing the operation of said mechanism when adjusted to an intermediate position.

19. A calling device comprising impulse mechanism provided with a plurality of operative positions, a setting member for adjusting said mechanism to any one of its positions, means for releasing said mechanism for operation when adjusted to any one of its operative positions by a subsequent operation of the setting member, and means to prevent the operation of the said mechanism when adjusted to an intermediate position.

20. A calling device including an impulse mechanism provided with a plurality of operative positions, a setting member for adjusting said mechanism to any of its positions, means for releasing said mechanism for operation when adjusted to any of its operative positions, and means for preventing the operation of said member to release said mechanism when said member is adjusted to an intermediate position.

Signed by me at Chicago, county of Cook, and State of Illinois, in the presence of two witnesses.

WILLIAM KAISLING.

Witnesses:
 GEORGE E. MUELLER,
 CARRIE E. ANDERSON.